United States Patent
Nakajima et al.

(10) Patent No.: US 11,726,617 B2
(45) Date of Patent: Aug. 15, 2023

(54) ELECTROSTATIC COORDINATE INPUT DEVICE AND ELECTROSTATIC COORDINATE CALCULATION METHOD

(71) Applicant: Alps Alpine Co., Ltd., Tokyo (JP)

(72) Inventors: Satoshi Nakajima, Miyagi-ken (JP); Shinichi Endo, Miyagi-ken (JP); Minoru Watanabe, Miyagi-ken (JP); Harry Haryadi, Miyagi-ken (JP)

(73) Assignee: Alps Alpine Co., Ltd.

( * ) Notice: Subject to any disclaimer, the term of this patent is extended or adjusted under 35 U.S.C. 154(b) by 0 days.

(21) Appl. No.: 17/557,398

(22) Filed: Dec. 21, 2021

(65) Prior Publication Data

US 2022/0206665 A1 Jun. 30, 2022

(30) Foreign Application Priority Data

Dec. 25, 2020 (JP) .................................. 2020-217513

(51) Int. Cl.
*G06F 3/041* (2006.01)
*G06F 3/044* (2006.01)

(52) U.S. Cl.
CPC ........ *G06F 3/04186* (2019.05); *G06F 3/0446* (2019.05); *G06F 2203/04104* (2013.01)

(58) Field of Classification Search
CPC .............. G06F 3/04186; G06F 3/0446; G06F 2203/04104; G06F 2203/04108
See application file for complete search history.

(56) References Cited

U.S. PATENT DOCUMENTS

| | | | |
|---|---|---|---|
| 8,917,257 B2 | 12/2014 | Hatano | |
| 11,301,099 B1* | 4/2022 | Shahsavari | G06F 3/0445 |
| 2012/0235936 A1* | 9/2012 | Yeh | G06F 3/0443 345/173 |
| 2012/0319994 A1* | 12/2012 | Hatano | G06F 3/04186 345/174 |
| 2014/0035859 A1* | 2/2014 | Wilson | G06F 3/0442 345/173 |
| 2015/0138147 A1* | 5/2015 | Hatano | G06F 3/0446 345/174 |
| 2015/0378497 A1* | 12/2015 | Ningrat | G06F 3/044 345/174 |
| 2017/0228066 A1* | 8/2017 | Chiang | G06F 3/0445 |
| 2018/0074637 A1* | 3/2018 | Rosenberg | G06F 3/04166 |
| 2022/0137780 A1* | 5/2022 | Kim | G06F 3/0447 345/173 |

FOREIGN PATENT DOCUMENTS

JP 2014-186530 A 10/2014

\* cited by examiner

*Primary Examiner* — Ibrahim A Khan
(74) *Attorney, Agent, or Firm* — Harness, Dickey & Pierce, P.L.C.

(57) ABSTRACT

An electrostatic coordinate input device includes a finger detection unit that detects a proximity position of a finger of an operator on an operation surface by a capacitive sensing method; and a correction unit that, in a case where two proximity positions corresponding to two fingers are detected by the finger detection unit, corrects the two proximity positions so as to increase a distance between the two proximity positions.

6 Claims, 6 Drawing Sheets

ELECTROSTATIC COORDINATE INPUT DEVICE AND ELECTROSTATIC COORDINATE CALCULATION METHOD

CLAIM OF PRIORITY

This application claims benefit of Japanese Patent Application No. 2020-217513 filed on Dec. 25, 2020, the entirety of which is hereby incorporated by reference.

BACKGROUND OF THE INVENTION

1. Field of the Invention

The present invention relates to an electrostatic coordinate input device and an electrostatic coordinate calculation method.

2. Description of the Related Art

Conventionally, a technique of complementarily calculating, as coordinates of a finger proximity position, coordinates of a peak of a quadratic curve passing coordinates of a detection electrode whose amount of change in electrostatic capacitance is a maximum value and coordinates of an adjacent detection electrode is used in an electrostatic coordinate input device for detecting a finger proximity position according to a capacitive sensing method (see, for example, U.S. Pat. No. 8,917,257B2).

SUMMARY OF THE INVENTION

However, according to conventional arts, especially in a case where an operator performs proximity operations using two fingers concurrently on an operation surface of a product of a low resolution (e.g., a product having a small number of detection electrodes, a product that detects a finger far from a detection electrode), changes in electrostatic capacitance caused by the two fingers influence each other, and therefore coordinates of two peaks of a quadratic curve fluctuate to approach each other. This may undesirably lower accuracy of detection of proximity positions of the two fingers.

An electrostatic coordinate input device according to an embodiment includes a finger detection unit that detects a proximity position of a finger of an operator on an operation surface by a capacitive sensing method; and a correction unit that, in a case where two proximity positions corresponding to two fingers are detected by the finger detection unit, corrects the two proximity positions so as to increase a distance between the two proximity positions.

According to the embodiment, accuracy of detection of proximity positions of two fingers can be increased in a case where an operator performs proximity operations concurrently on an operation surface by using the two fingers.

DESCRIPTION OF THE PREFERRED EMBODIMENTS

An embodiment of the present invention is described below with reference to the drawings.

Figure 1:
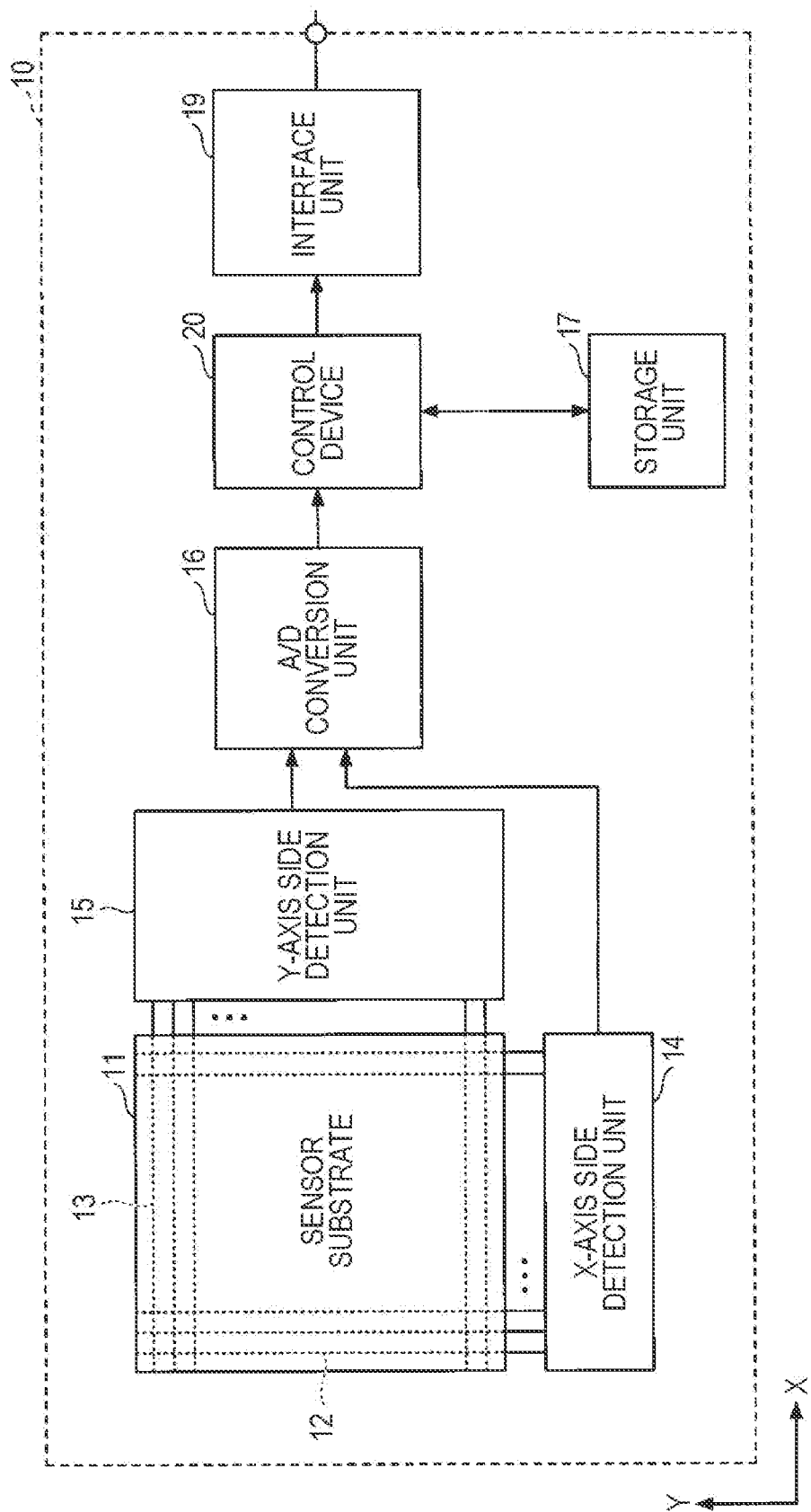
FIG. 1 is a block diagram illustrating a configuration of an electrostatic coordinate input device according to an embodiment.

FIG. 1 is a block diagram illustrating a configuration of an electrostatic coordinate input device 10 according to the embodiment. The electrostatic coordinate input device 10 illustrated in FIG. 1 is a device that allows an operator to perform a proximity operation on an operation surface 10A by using a finger and is a device that can detect a proximity position of the finger of the operator by a capacitive sensing method (a self-capacitive sensing method or a mutual capacitive sensing method).

As illustrated in FIG. 1, the electrostatic coordinate input device 10 includes a sensor substrate 11, an X-axis side detection unit 14, a Y-axis side detection unit 15, an A/D conversion unit 16, a storage unit 17, a control device 20, and an interface unit 19.

Figure 4:
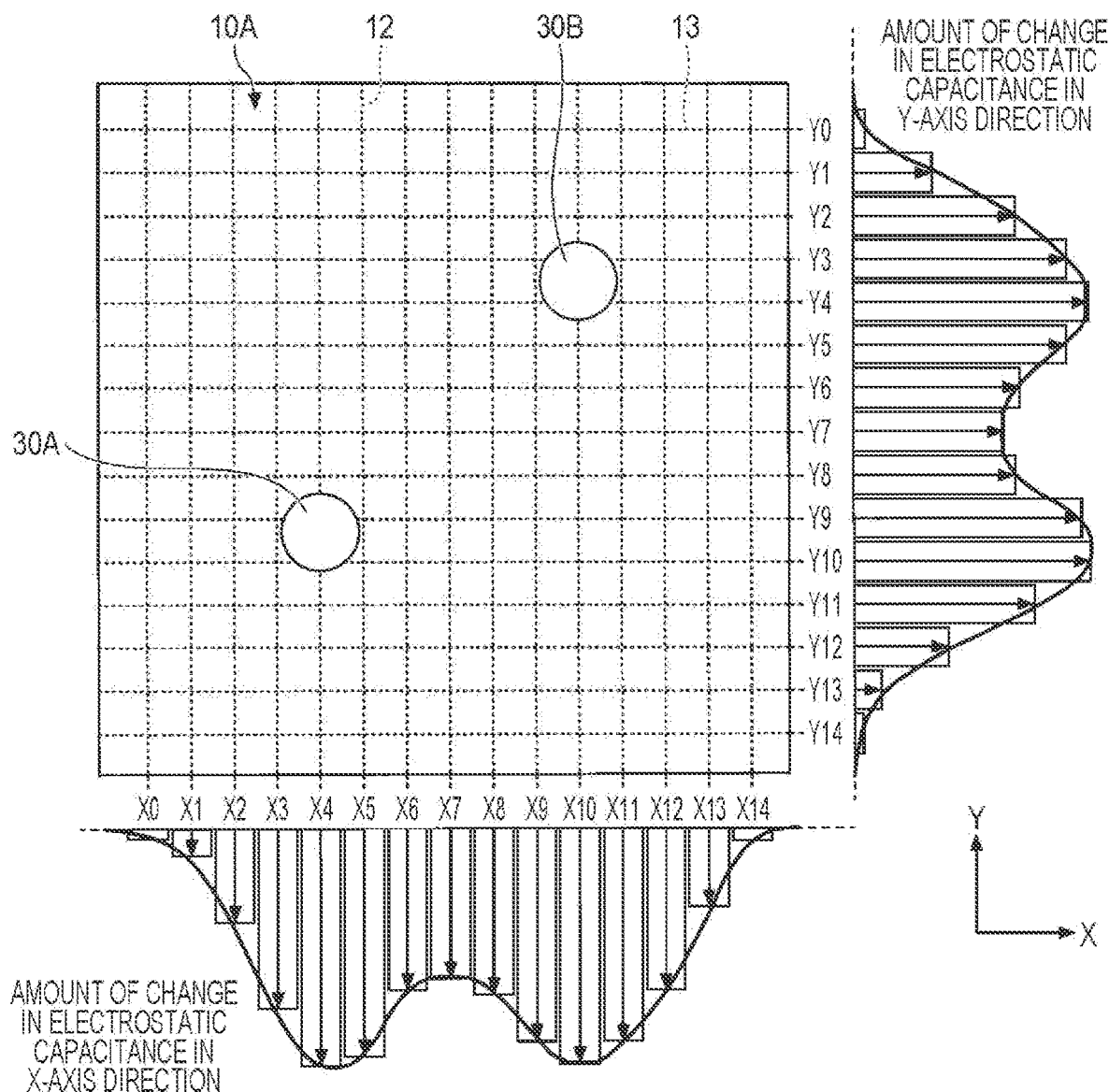
FIG. 4 illustrates an example of calculation of two proximity positions by the control device (finger detection unit) according to the embodiment.

The sensor substrate 11 is provided on a rear side of the operation surface 10A (see FIG. 4). The sensor substrate 11 is provided with a plurality of X-axis electrodes 12 for detecting electrostatic capacitance in an X-axis direction (horizontal direction in FIG. 1) and a plurality of Y-axis electrodes 13 for detecting electrostatic capacitance in a Y-axis direction (vertical direction in FIG. 1) that are arranged in a matrix.

The X-axis side detection unit 14 detects electrostatic capacitance of each of the plurality of X-axis electrodes 12. Furthermore, the X-axis side detection unit 14 outputs a detection signal (analog signal) indicative of detected electrostatic capacitance of each of the plurality of X-axis electrodes 12.

The Y-axis side detection unit 15 detects electrostatic capacitance of each of the plurality of Y-axis electrodes 13. Furthermore, the Y-axis side detection unit 15 outputs a detection signal (analog signal) indicative of detected electrostatic capacitance of each of the plurality of Y-axis electrodes 13.

The A/D (analog/digital) conversion unit 16 converts a detection signal output from the X-axis side detection unit 14 and a detection signal output from the Y-axis side detection unit 15 into digital signals and supply the digital signals to the control device 20.

The storage unit 17 stores therein various kinds of information. Examples of the information stored in the storage unit 17 include electrostatic capacitance values of the plurality of X-axis electrodes 12 detected by the X-axis side detection unit 14, electrostatic capacitance values of the plurality of Y-axis electrodes 13 detected by the Y-axis side detection unit 15, and programs executed by the control device 20.

The control device 20 detects a proximity position of a finger in the X-axis direction on the operation surface 10A based on changes in electrostatic capacitance of the plurality of X-axis electrodes 12 specified by the detection signal supplied from the X-axis side detection unit 14 through the A/D conversion unit 16. Furthermore, the control device 20 detects a proximity position of a finger in the Y-axis direction on the operation surface 10A based on changes in electrostatic capacitance of the plurality of Y-axis electrodes 13 specified by the detection signal supplied from the Y-axis side detection unit 15 through the A/D conversion unit 16. Then, the control device 20 outputs coordinate information indicative of the specified proximity position of the finger. Note that details of functions of the control device 20 will be described later with reference to FIG. 2.

The interface unit 19 outputs, to an external device (not illustrated), the coordinate information indicative of the proximity position of the finger output from the control device 20. For example, the external device executes predetermined processing corresponding to the coordinates in accordance with the coordinate information indicative of the proximity position of the finger output from the interface unit 19.

Functional Configuration of Control Device 20

Figure 2:
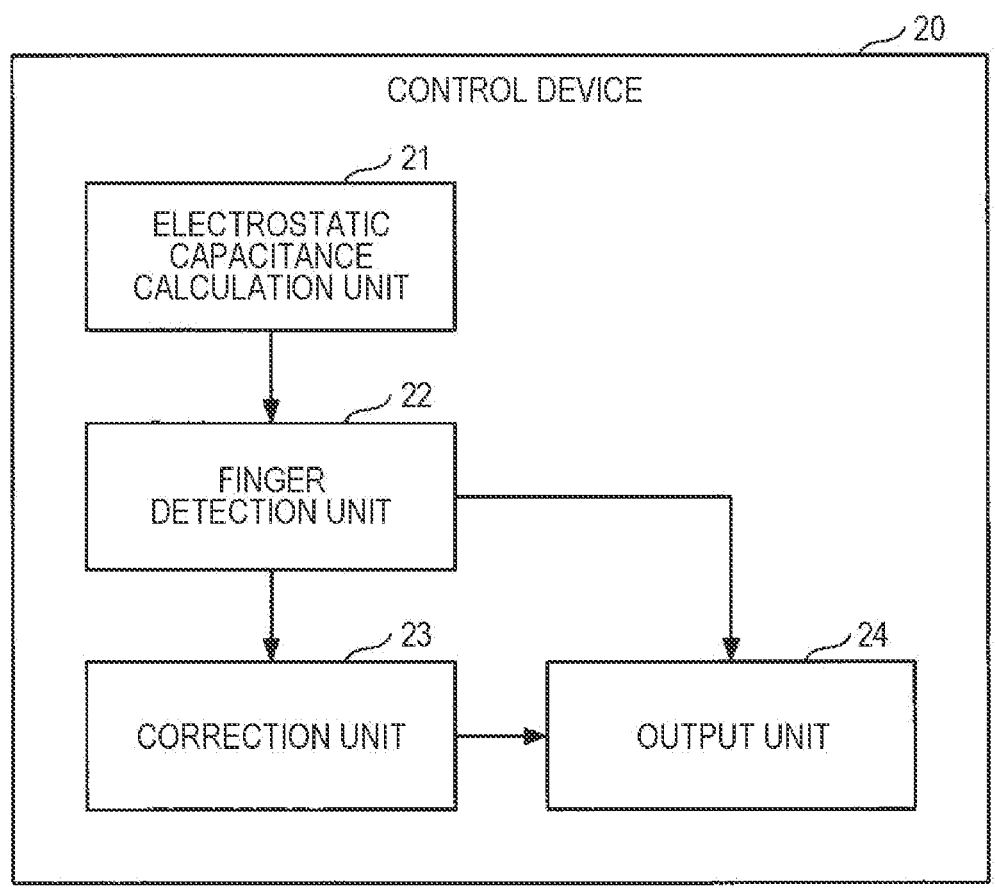
FIG. 2 is a block diagram illustrating a functional configuration of a control device according to the embodiment.

FIG. 2 is a block diagram illustrating a functional configuration of the control device 20 according to the embodiment. As illustrated in FIG. 2, the control device 20 includes an electrostatic capacitance calculation unit 21, a finger detection unit 22, a correction unit 23, and an output unit 24.

The electrostatic capacitance calculation unit 21 calculates amounts of change in electrostatic capacitance of the detection electrodes based on the detection signals supplied from the X-axis side detection unit 14 and the Y-axis side detection unit 15 through the A/D conversion unit 16.

The finger detection unit 22 detects a proximity position of a finger of an operator in each of the X-axis direction and the Y-axis direction based on the amounts of change in electrostatic capacitance of the detection electrodes detected by the electrostatic capacitance calculation unit 21.

In the present embodiment, the finger detection unit 22 can detect a proximity position of a finger of an operator in each of the X-axis direction and the Y-axis direction by using a curve approximation calculation method. Specifically, the finger detection unit 22 can calculate, as a proximity position of a finger of an operator in each of the X-axis direction and the Y-axis direction, a vertex of a quadratic curve passing a peak electrode, which is an electrode that is largest in an amount of change in electrostatic capacitance, an electrode immediately followed by the peak electrode, and an electrode immediately following the peak electrode according to following formula (1):

$$XQ = \frac{X_{pk-1} - X_{pk+1}}{2(X_{pk-1} + X_{pk+1} + 2X_{pk})} \times RESO + X_{OFS} \quad (1)$$

In the formula (1), XQ represents coordinates of the proximity position of the finger of the operator. $X_{pk}$ represents an amount of change in electrostatic capacitance in the peak electrode. $X_{pk-1}$ represents an amount of change in electrostatic capacitance in the detection electrode immediately followed by the peak electrode. $X_{pk+1}$ represents an amount of change in electrostatic capacitance in the detection electrode immediately following the peak electrode. RESO represents a resolution between electrodes. $X_{OFS}$ represents coordinates of the peak electrode.

In the present embodiment, in a case where an operator performs proximity operations on the operation surface 10A by using two fingers, the finger detection unit 22 of the control device 20 can specify proximity positions of the two fingers of the operator in each of the X-axis direction and the Y-axis direction.

The correction unit 23 corrects the two proximity positions so as to increase a distance between the two proximity positions in a case where the distance between the two proximity positions detected by the finger detection unit 22 is shorter than a predetermined threshold value. In particular, in the present embodiment, the correction unit 23 corrects the distance between the two proximity positions to a predetermined distance larger than the distance between the two proximity positions in a case where the distance between the two proximity positions detected by the finger detection unit 22 is less than the predetermined threshold value. For example, in a case where the distance between the two proximity positions detected by the finger detection unit 22 is less than "21 mm" (an example of the "predetermined threshold value"), the correction unit 23 corrects the distance between the two proximity positions to "21 mm" (an example of the "predetermined distance").

The output unit 24 outputs coordinate information indicative of a proximity position of a finger of an operator detected by the finger detection unit 22. Alternatively, the output unit 24 outputs coordinate information indicative of a proximity position of a finger of an operator corrected by the correction unit 23.

The control device 20 includes, as hardware elements, a processor (e.g., a CPU), a storage medium (e.g., a read only memory (ROM), a random access memory (RAM), a solid state drive (SSD)), and a communication interface. For example, the processor executes programs stored in the storage medium, and thus the functional units of the control device 20 illustrated in FIG. 2 are realized. At least any one of the A/D conversion unit 16, the storage unit 17, and the interface unit 19 may be provided in the control device 20.

Procedure of Processing Performed by Control Device 20.

Figure 3:
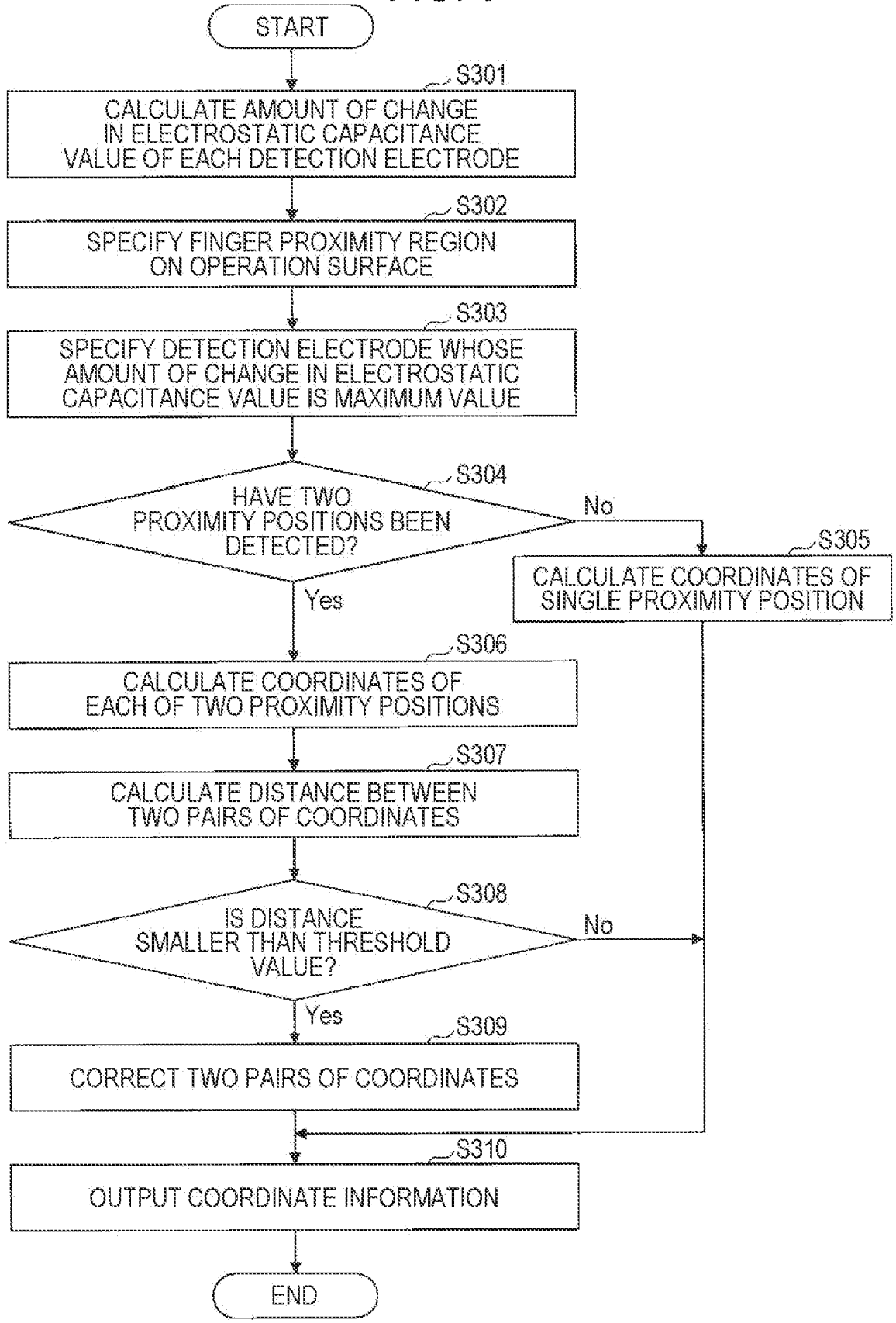
FIG. 3 is a flowchart illustrating a procedure of processing performed by the control device according to the embodiment.

FIG. 3 is a flowchart illustrating a procedure of processing performed by the control device 20 according to the embodiment.

First, the electrostatic capacitance calculation unit 21 of the control device 20 calculates amounts of change in electrostatic capacitance of the detection electrodes based on detection signals supplied from the X-axis side detection unit 14 and the Y-axis side detection unit 15 through the A/D conversion unit 16 (step S301).

Next, the finger detection unit 22 of the control device 20 specifies a finger proximity region on the operation surface 10A based on the amounts of change in electrostatic capacitance of the detection electrodes calculated in step S301 (step S302). For example, the finger detection unit 22 detects, as the finger proximity region, a region including a plurality of detection electrodes whose amounts of change in electrostatic capacitance are larger than a predetermined threshold value.

Next, the finger detection unit 22 of the control device 20 specifies a detection electrode whose amount of change in electrostatic capacitance is maximum among the plurality of detection electrodes by comparing the amounts of change in electrostatic capacitance of the plurality of detection electrodes included in the finger proximity region specified in step S302 (step S303).

Next, the finger detection unit 22 of the control device 20 determines whether or not two proximity positions have been detected (i.e., whether or not two fingers have been detected) based on the detection electrode specified in step S303 whose amount of change in electrostatic capacitance is maximum (step S304). For example, in a case where two detection electrodes are specified in step S303, the finger detection unit 22 determines that two proximity positions have been detected.

In a case where it is determined in step S304 that two proximity positions have not been detected (No in step S304), that is, in a case where it is determined that a single proximity position has been detected, the finger detection unit 22 calculates coordinates of the single proximity position by using a curve approximation calculation method (step S305). Then, the output unit 24 outputs coordinate information including the coordinates of the single proximity position calculated in step S305 (step S310). Then, the control device 20 finishes the series of processing illustrated in FIG. 3.

Meanwhile, in a case where it is determined in step S304 that two proximity positions have been detected (Yes in step S304), the finger detection unit 22 calculates coordinates of each of the two proximity positions by using a curve approximation calculation method (step S306).

Next, the correction unit 23 calculates a distance between the two pairs of coordinates calculated in step S306 (step S307). Then, the correction unit 23 determines whether or not the distance calculated in step S307 is less than a predetermined threshold value (e.g., "21 mm") (step S308).

In a case where it is determined in step S308 that the distance between the two pairs of coordinates is not less than the predetermined threshold value (No in step S308), the output unit 24 outputs coordinate information including the two pairs of coordinates calculated in step S306 (step S310). Then, the control device 20 finishes the series of processing illustrated in FIG. 3.

Meanwhile, in a case where it is determined in step S308 that the distance between the two pairs of coordinates is less than the predetermined threshold value (Yes in step S308), the correction unit 23 corrects the two pairs of coordinates so that the distance between the two pairs of coordinates is increased to a predetermined distance (e.g., "21 mm") (step S309). For example, the correction unit 23 finds a segment connecting the two pairs of coordinates and a central point of the segment, and corrects the two pairs of coordinates so that distances from the central point to the two pairs of coordinates become equal.

Then, the output unit 24 outputs coordinate information including the two pairs of coordinates obtained by the correction in step S309 (step S310). Then, the control device 20 finishes the series of processing illustrated in FIG. 3.

In the present embodiment, when two fingers are rotated in proximity with each other at an interval of 21 mm or less, coordinate information indicating that the fingers have been rotated at an identical interval (21 mm) is output.

Example of Calculation of Two Proximity Positions

FIG. 4 illustrates an example of calculation of two proximity positions by the control device 20 (finger detection unit 22) according to the embodiment.

In the example illustrated in FIG. 4, the sensor substrate 11 is provided with 15 X-axis electrodes 12 (X0 to X14) and 15 Y-axis electrodes 13 (Y0 to Y14) that are provided in a matrix so as to be superimposed on the operation surface 10A. In the example illustrated in FIG. 4, an operation performs proximity operations on the operation surface 10A by using two fingers 30A and 30B.

As illustrated in FIG. 4, in the X-axis direction, there are peaks in amount of change in electrostatic capacitance at the X-axis electrode X4 that overlaps the finger 30A and at the X-axis electrode X10 that overlaps the finger 30B.

For example, the finger detection unit 22 of the control device 20 can calculate, as an X-axis coordinate of a proximity position of the finger 30A, an X-axis coordinate of a vertex position of a quadratic curve passing the X-axis electrode X4, the X-axis electrode X3 followed by the X-axis electrode X4, and the X-axis electrode X5 following the X-axis electrode X4 by using a curve approximation calculation method.

Similarly, the finger detection unit 22 of the control device 20 can calculate, as an X-axis coordinate of a proximity position of the finger 30B, an X-axis coordinate of a vertex position of a quadratic curve passing the X-axis electrode X10, the X-axis electrode X9 followed by the X-axis electrode X10, and the X-axis electrode X11 following the X-axis electrode X10 by using a curve approximation calculation method.

As illustrated in FIG. 4, in the Y-axis direction, there are peaks in amount of change in electrostatic capacitance at the Y-axis electrode Y10 that overlaps the finger 30A and at the Y-axis electrode Y4 that overlaps the finger 30B.

For example, the finger detection unit 22 of the control device 20 can calculate, as a Y-axis coordinate of the proximity position of the finger 30A, a Y-axis coordinate of a vertex position of a quadratic curve passing the Y-axis electrode Y10, the Y-axis electrode Y9 followed by the Y-axis electrode Y10, and the Y-axis electrode Y11 following the Y-axis electrode Y10 by using a curve approximation calculation method.

Similarly, the finger detection unit 22 of the control device 20 can calculate, as a Y-axis coordinate of the proximity position of the finger 30B, a Y-axis coordinate of a vertex position of a quadratic curve passing the Y-axis electrode Y4, the Y-axis electrode Y3 followed by the Y-axis electrode Y4, and the Y-axis electrode Y5 following the Y-axis electrode Y4 by using a curve approximation calculation method.

Example of Error of Amount of Change in Electrostatic Capacitance

Figure 5:
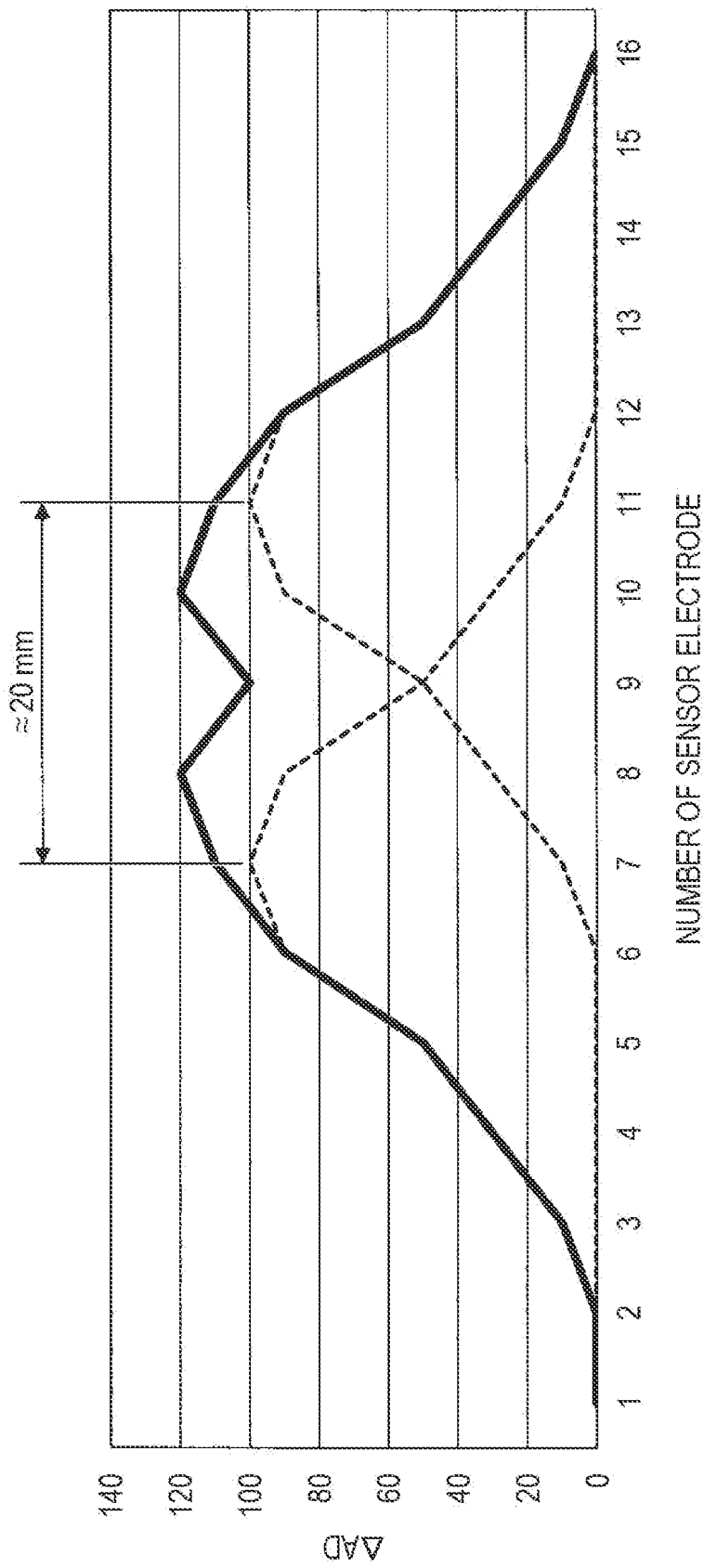
FIG. 5 illustrates an example of an error of an amount of change in electrostatic capacitance that can occur in the electrostatic coordinate input device according to the embodiment.

FIG. 5 illustrates an example of an error of an amount of change in electrostatic capacitance that can occur in the electrostatic coordinate input device 10 according to the embodiment.

In FIG. 5, the broken line indicates amounts of change in electrostatic capacitance of the detection electrodes obtained when two fingers are detected individually in a case where a distance between the two fingers is "20 mm". Meanwhile, in FIG. 5, the solid line indicates amounts of change in electrostatic capacitance of the detection electrodes obtained when two fingers are detected concurrently in a case where a distance between the two fingers is "20 mm". In the graph illustrated in FIG. 5, the horizontal axis represents a number and a position of a detection electrode, and the vertical axis represents an amount of change in electrostatic capacitance value. In the graph illustrated in FIG. 5, it is assumed that an interval between electrodes is "5 mm".

As indicated by the broken line in FIG. 5, in a case where the two fingers are detected individually, a distance between two peak electrodes is substantially identical to an actual distance ("20 mm") between the two fingers since a change in electrostatic capacitance caused by one finger does not influence a change in electrostatic capacitance caused by the other finger. Meanwhile, as indicated by the solid line in FIG. 5, in a case where two fingers are detected concurrently, changes in electrostatic capacitance caused by the two fingers are combined, and therefore a distance between two peak electrodes may undesirably become shorter than the actual distance ("20 mm") between the two fingers. In this case, a distance between two proximity positions calculated by the finger detection unit 22 may undesirably become shorter than the actual distance between the two fingers.

In view of this, in a case where the distance between the two proximity positions calculated by the finger detection unit 22 is less than a predetermined threshold value (e.g., "21 mm"), the control device 20 according to the embodiment corrects the distance between the two proximity positions to a predetermined distance (e.g., "21 mm"). In this way, the control device 20 according to the embodiment can correct coordinates of the two proximity positions so that the distance between the two proximity positions becomes substantially equal to the actual distance between the two fingers. As a result, in a case where an operator performs proximity operations on the operation surface 10A by using two fingers, the control device 20 according to the embodiment can increase accuracy of detection of proximity positions of the two fingers.

The predetermined distance is set to "21 mm" in the present embodiment because it is generally unlikely that an interval between centers of adjacent two fingers (e.g., an index finger and a middle finger) that are in close contact with each other becomes smaller than "21 mm".

Comparative Examples of Correction Method

Figure 6:
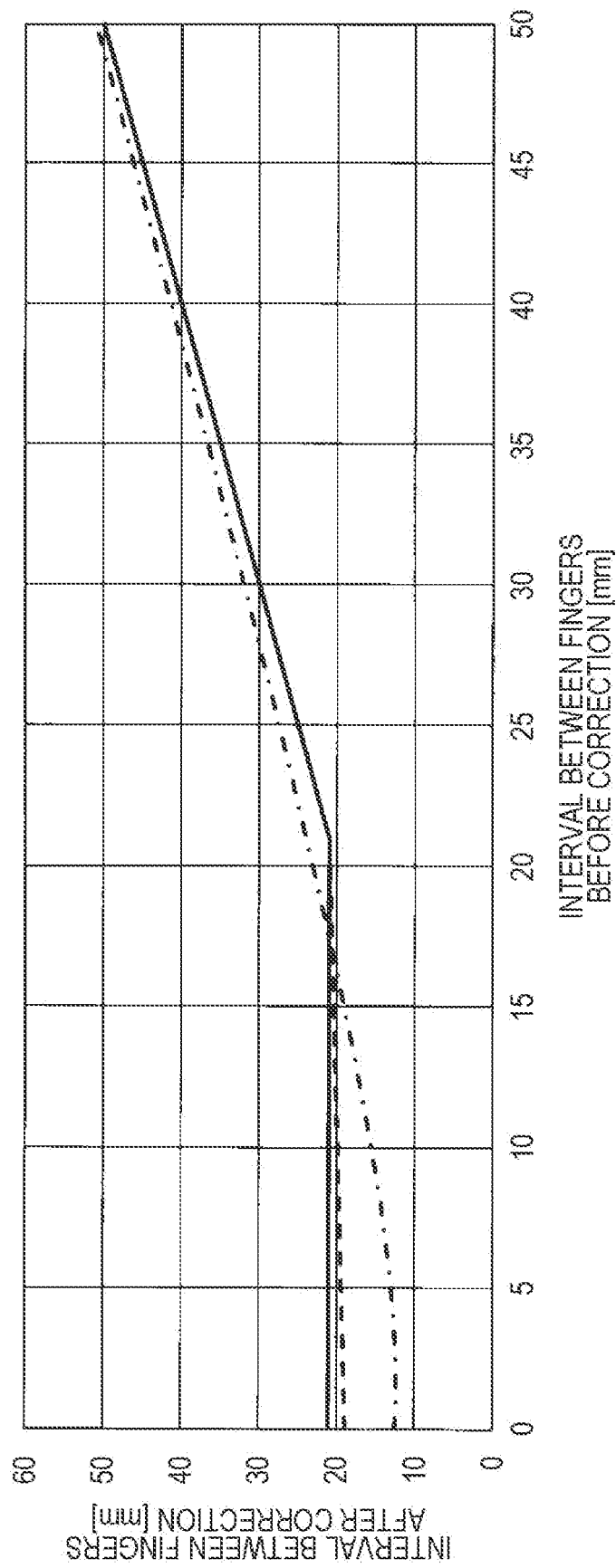
FIG. 6 illustrates a relationship between a calculated value before correction and a calculated value after correction for each of correction methods for correction performed by the control device (correction unit) according to the embodiment.

FIG. 6 illustrates a relationship between a calculated value before correction and a calculated value after correction for each of correction methods for correction performed by the control device 20 (correction unit 23) according to the embodiment.

In FIG. 6, a relationship between a calculated value before correction and a calculated value after correction in a case where the correction unit 23 performs correction by a first correction method is indicated by the solid line. In the graph illustrated in FIG. 6, the horizontal axis represents a calculated value before correction of a distance between two proximity positions, and the vertical axis represents a calculated value after correction of the distance between the two proximity positions.

The first correction method is a method for correcting a distance between two proximity positions to a predetermined distance larger than the distance between the two proximity positions in a case where the distance between the two proximity positions is less than a predetermined threshold value. For example, FIG. 6 illustrates, as the first correction method, an example in which a distance between two proximity positions is corrected to "21 mm" (an example of the "predetermined distance") in a case where the distance between the two proximity positions is less than "21 mm" (an example of the "predetermined threshold value").

In FIG. 6, a relationship between a calculated value before correction and a calculated value after correction in a case where the correction unit 23 performs correction by a second correction method is indicated by the broken line. The second correction method is a method for correcting a distance between two proximity positions so that a difference from a predetermined distance larger than the distance between the two proximity positions becomes smaller as the distance between the two proximity positions becomes longer in a case where the distance between the two proximity positions is less than a predetermined threshold value. For example, FIG. 6 illustrates, as the second correction method, an example in which a distance between two proximity positions is corrected so that a difference from "21 mm" (an example of the "predetermined distance") becomes smaller as the distance between the two proximity positions becomes longer in a case where the distance between the two proximity positions is less than "21 mm" (an example of the "predetermined threshold value"). For example, in the second correction method, a calculated value after correction of the distance between the two proximity positions can be calculated according to a formula {x/constant 1+ constant 2} where x is a calculated value before correction. Note, however, that this formula is an example, and the calculated value after correction may be calculated by using a different formula. Appropriate values can be set in advance as the constants 1 and 2, for example, by simulation.

In FIG. 6, a relationship between a calculated value before correction and a calculated value after correction in a case where the correction unit 23 performs correction by a third correction method is indicated by the line with alternate long and short dashes. The third correction method is a method for correcting a distance between two proximity positions to a larger value so that an amount of correction becomes larger as the distance between the two proximity positions becomes shorter. For example, in the third correction method, a calculated value after correction of the distance between the two proximity positions can be calculated according to a formula { [小寺1] X+ constant 3/(X*constant 4+ constant 5)/\2} where X is a calculated value before correction. Note, however, that this formula is an example, and the calculated value after correction may be calculated by using a different formula. Appropriate values can be set in advance as the constants 3 to 5, for example, by simulation.

The correction unit 23 may use any one of the first to third correction methods as a method for correcting a distance between two proximity positions. By using any one of these correction methods, the correction unit 23 can increase accuracy of detection of two proximity positions by appropriately correcting a distance between the two proximity positions so that the distance between the two proximity positions does not become an abnormal value. In particular, in a case where an operation is performed by using two fingers, central coordinates between two positions, a direction (angle) of a segment connecting the two positions, and an interval between the two positions are important. According to the present invention, accuracy of the interval between the two positions can be increased without deteriorating accuracy of the central coordinates between the two positions and accuracy of the direction (angle) of the segment connecting the two positions.

Although the embodiment of the present invention has been described in detail above, the present invention is not limited to the embodiment and can be modified and changed in various ways within the scope of the present invention recited in the claims.

For example, although the finger detection unit 22 calculates coordinates of two proximity positions by a curve approximation calculation method based on a position of a detection electrode whose amount of change in electrostatic capacitance is a maximum value, this is not restrictive. For example, the finger detection unit 22 may calculate coordinates of two proximity positions by a center of gravity calculation method based on a position of a detection electrode whose amount of change in electrostatic capacitance is a maximum value.

What is claimed is:

1. An electrostatic coordinate input device comprising:
   a memory configured to store a program; and
   a processor configured to execute the program so as to:
   detect a proximity position of a finger of an operator on an operation surface by a capacitive sensing method;
   detect two proximity positions of two fingers of the operator on the operation surface by the capacitive sensing method;
   determine whether a distance between the two proximity positions is less than a predetermined threshold value; and
   when the processor determines that the distance between the two proximity positions is less than the predetermined threshold value, correct the distance between the two proximity positions so that a difference between a predetermined distance and a corrected distance, becomes smaller as the distance between the two proximity positions becomes longer, wherein the predetermine distance is larger than the distance between the two proximity positions.

2. The electrostatic coordinate input device according to claim 1,
   wherein the processor is configured to calculate coordinates of the two proximity positions by a curve approximation calculation method based on a position of a detection electrode whose amount of change in electrostatic capacitance is a maximum value.

3. The electrostatic coordinate input device according to claim 1,
   wherein the processor is configured to calculate coordinates of the two proximity positions by a gravity center calculation method based on a position of a detection electrode whose amount of change in electrostatic capacitance is a maximum value.

4. An electrostatic coordinate input device comprising:
   a memory configured to store a program; and
   a processor configured to execute the program so as to:
   detect a proximity position of a finger of an operator on an operation surface by a capacitive sensing method;
   detect two proximity positions of two fingers of the operator on the operation surface by the capacitive sensing method; and
   correct the two proximity positions by increasing a distance between the two proximity positions so that an amount of the correction becomes larger as the distance between the two proximity positions becomes shorter.

5. The electrostatic coordinate input device according to claim 4,
   wherein the processor is configured to calculate coordinates of the two proximity positions by a curve approximation calculation method based on a position of a detection electrode whose amount of change in electrostatic capacitance is a maximum value.

6. The electrostatic coordinate input device according to claim 4,
   wherein the processor is configured to calculate coordinates of the two proximity positions by a gravity center calculation method based on a position of a detection electrode whose amount of change in electrostatic capacitance is a maximum value.

* * * * *